(12) United States Patent
Poellmann et al.

(10) Patent No.: US 10,494,258 B2
(45) Date of Patent: Dec. 3, 2019

(54) METHOD AND INSTALLATION FOR CONCENTRATING AQUEOUS HYDROGEN HALIDE SOLUTIONS

(71) Applicant: SGL CARBON SE, Wiesbaden (DE)

(72) Inventors: Peter Poellmann, Meitingen (DE); Marcus Franz, Meitingen (DE); Andre Boucaut, Meitingen (DE); Rolf Ambrassat, Meitingen (DE)

(73) Assignee: SGL Carbon SE, Wiesbaden (DE)

( * ) Notice: Subject to any disclaimer, the term of this patent is extended or adjusted under 35 U.S.C. 154(b) by 446 days.

(21) Appl. No.: 14/690,610

(22) Filed: Apr. 20, 2015

(65) Prior Publication Data

US 2015/0225234 A1 Aug. 13, 2015

Related U.S. Application Data

(63) Continuation of application No. PCT/EP2013/071611, filed on Oct. 16, 2013.

(30) Foreign Application Priority Data

Oct. 19, 2012 (DE) .................. 10 2012 219 153

(51) Int. Cl.
*C01B 7/07* (2006.01)
*B01D 3/40* (2006.01)
*C01B 7/00* (2006.01)

(52) U.S. Cl.
CPC .............. *C01B 7/0712* (2013.01); *B01D 3/40* (2013.01); *C01B 7/00* (2013.01); *C01B 7/0731* (2013.01); *C01B 7/0737* (2013.01)

(58) Field of Classification Search
CPC ....... C01B 7/00; C01B 7/0712; C01B 7/0731; C01B 7/0737; B01D 3/40
See application file for complete search history.

(56) References Cited

U.S. PATENT DOCUMENTS 2,542,961 A   2/1951 Johnson et al.
3,338,799 A * 8/1967 Brandt ................... B01D 3/40
                                                    159/18
(Continued)

FOREIGN PATENT DOCUMENTS

AU        5872786 A    12/1986
CN      101525121 A     9/2009
(Continued)

OTHER PUBLICATIONS

Minton, Paul E. "Chapter 11: Evaporator Types and Applications." Handbook of Evaporation Technology. Weswood: Noyes Publications, 1986. 70-89.*

(Continued)

*Primary Examiner* — Renee Robinson
(74) *Attorney, Agent, or Firm* — Laurence A. Greenberg; Werner H. Stemer; Ralph E. Locher

(57) ABSTRACT

A method for concentrating an aqueous hydrogen halide starting solution, in particular hydrochloric acid, includes the steps of extractive distillation of the aqueous hydrogen halide starting solution in the presence of an extraction agent in a distillation device, removing hydrogen halide vapor and/or hydrogen halide gas from the upper portion of the distillation device, removing an extraction-agent-containing solution from the lower portion of the distillation device, concentrating the extraction-agent-containing solution which is removed from the lower portion of the distillation device in an evaporation device, and returning the extraction-agent-containing solution which is concentrated in the evaporation device to the distillation device, wherein the extraction-agent-containing solution removed from the lower portion of the distillation device is concentrated in the evaporation device by evaporation at a pressure which is greater than atmospheric pressure.

33 Claims, 1 Drawing Sheet

(56) References Cited

U.S. PATENT DOCUMENTS

| | | | |
|---|---|---|---|
| 4,032,412 A * | 6/1977 | Hoppe | B01D 1/00 |
| | | | 202/173 |
| 4,296,072 A | 10/1981 | Takacs et al. | |
| 4,372,822 A * | 2/1983 | Muller | B01D 3/146 |
| | | | 203/19 |
| 6,540,973 B1 | 4/2003 | Sasaki et al. | |

FOREIGN PATENT DOCUMENTS

| | | | | |
|---|---|---|---|---|
| DE | 2062411 A1 * | 7/1971 | | B01D 3/40 |
| DE | 3521632 A1 | 12/1986 | | |
| DE | 256502 A1 | 5/1988 | | |
| EP | 0425922 A1 | 5/1991 | | |
| GB | 339671 | 12/1930 | | |
| GB | 669671 A | 4/1952 | | |
| JP | 05043203 A | 2/1993 | | |
| SU | 893852 A1 | 12/1981 | | |
| SU | 931119 A3 | 5/1982 | | |
| SU | 1367204 A1 | 7/1999 | | |

OTHER PUBLICATIONS

Smith, Lance. "Carbon Fiber Reinforced Graphite Tubes in Phosphoric Acid Evaporation." SGL Carbon Group (1997). Web. <http://www.aiche-cf.org/Clearwater/1997/Paper2/97.2.5.pdf>.*

Boehm, Robert. "Chaper 19: Direct Contact Heat Transfer." A-to-Z Guide to Thermodynamics Heat and Mass Transfer and Fluids Engineering. N.p:. n. p., 1987. 1359-399. Web. <https://www.researchgate.net/publication/236374769_Direct-Contact_Heat_Transfer>.*

Machine translation of DE 2062411 obtained from Espacenet.com Jul. 12, 2017.*

Norbert Asprion et al.: "Energy Management in Chemical Industry", in "Ullmann's Encyclopedia of Industrial Chemistry", Sep. 15, 2010 (Sep. 15, 2010), Wiley-VCH Verlag GmbH & Co. KGaA, Weinheim, Germany, XP055023075, ISBN: 978-3-52-730673-2, DOI: 10.1002/14356007.b03_12.pub2, pp. 501, 505, and p. 513.

Kopobahob et al., "Improvement on an Evaporator for Solutions Accompanied by Crystallization", Soda Industry, No. 5, pp. 45 and 50-51 (Publication date: Dec. 31, 1985, chinese language only).

DE Dietrich Process Systems Gmb: "Konzentrierung von Salzsaeure" (downloaded from www.qvf.de by German Patent Office on Sep. 12, 2013)—English abstract.

* cited by examiner

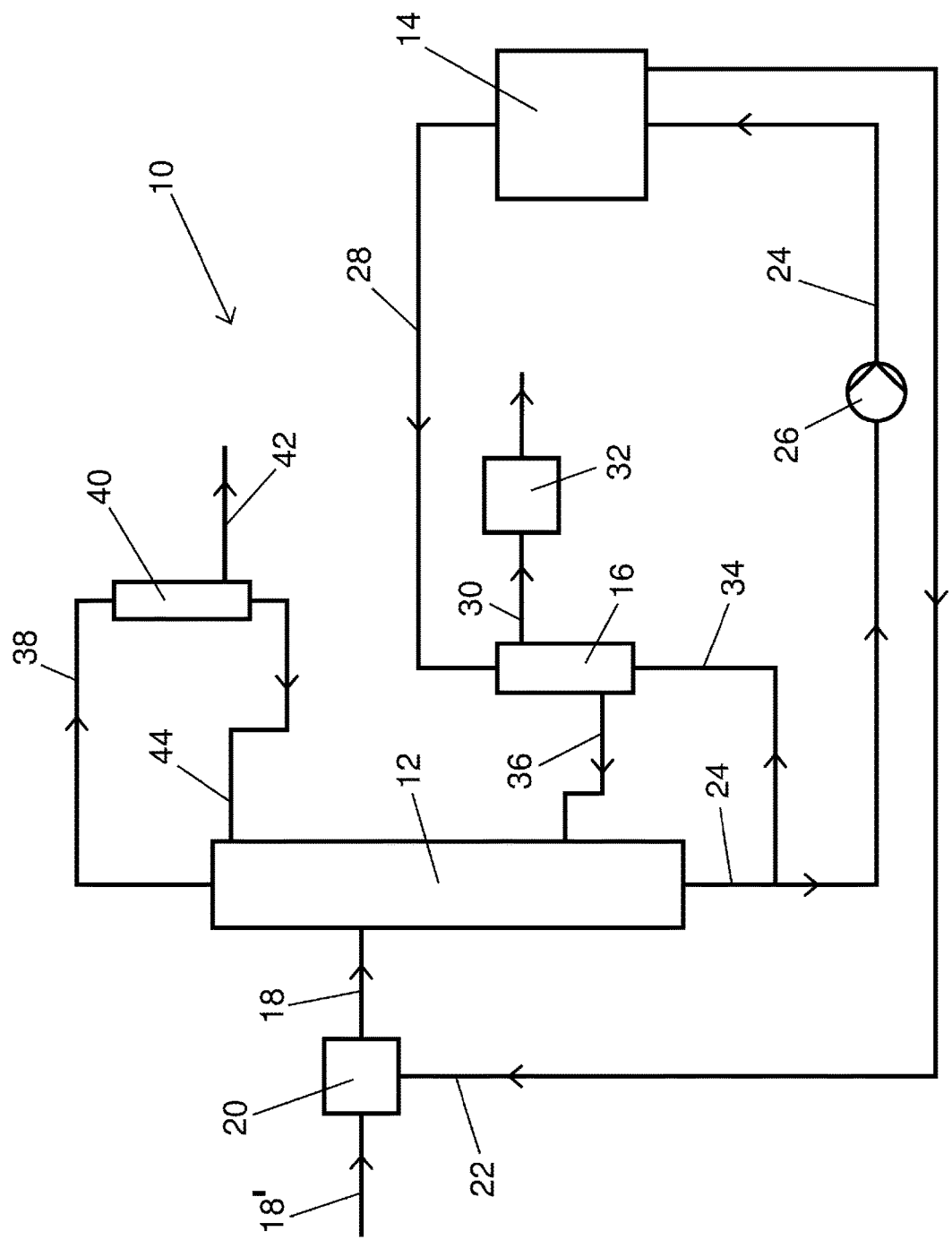

METHOD AND INSTALLATION FOR CONCENTRATING AQUEOUS HYDROGEN HALIDE SOLUTIONS

CROSS-REFERENCE TO RELATED APPLICATION

This application is a continuation, under 35 U.S.C. § 120, of copending international application No. PCT/EP2013/071611, filed Oct. 16, 2013, which designated the United States; this application also claims the priority, under 35 U.S.C. § 119, of German patent application No. DE 10 2012 219 153.4, filed Oct. 19, 2012; the prior applications are herewith incorporated by reference in their entirety.

BACKGROUND OF THE INVENTION

Field of the Invention

The present invention relates to a method for concentrating an aqueous hydrogen halide solution, in particular hydrochloric acid, and a system for concentrating an aqueous hydrogen halide solution.

Aqueous hydrogen halide solutions, such as hydrochloric acid, accumulate in many processes, such as in production processes in the chemical industry or during the incineration of waste. In these cases, said solutions are generally relatively dilute solutions which cannot readily be supplied to be re-used, since many chemical processes require the use of highly concentrated hydrogen halide solutions or even hydrogen halide gas. In addition, the transport costs of dilute solutions of this type are relatively high compared with the costs for more concentrated solutions, since large volumes of dilute hydrogen halide solution have to be transported in terms of the amount of substance of hydrogen halide. Therefore, there is a need to concentrate dilute aqueous hydrogen halide solutions, for example, by separating gaseous hydrogen halide from dilute aqueous hydrogen halide solutions.

Concentrated aqueous hydrogen halide solutions can be obtained by distilling dilute aqueous hydrogen halide solutions. Since aqueous hydrogen halide solutions and, in particular, hydrochloric acid are azeotropic mixtures, the maximum hydrogen halide content which can be achieved by simple distillation is, however, limited by the azeotrope of the mixture of hydrogen halide and water. Owing to this, the two components, hydrogen halide and water, of a dilute aqueous hydrogen halide solution cannot be completely separated from one another by simple distillation, but rather the hydrogen halide content can only be increased up to the concentration corresponding to the azeotrope by simple distillation. For example, dilute hydrochloric acid can only be concentrated up to a maximum hydrogen chloride content of approximately 20 wt. % by simple distillation at atmospheric pressure. In order to produce more highly concentrated hydrochloric acid, such as substantially anhydrous hydrogen chloride gas or pure hydrogen chloride gas, another method therefore needs to be used, such as extractive distillation.

In extractive distillation, a suitable extraction agent is added to the dilute aqueous hydrogen halide starting solution, such as a dilute hydrochloric acid, and selectively increases the volatility of one of the components of the aqueous hydrogen halide starting solution, that changes the separation factor. In addition, the extraction agent preferably does not form an azeotrope with any of the components to be separated and has a lower vapor pressure than the components to be separated. In this way, the extraction agent accumulates at the bottom of the column and does not contaminate the hydrogen halide accumulating at the head. Therefore, by adding an extraction agent, the concentration of aqueous hydrogen halide solutions through to desorption of hydrogen halide gas can be achieved.

Hygroscopic compounds, such as, in particular, sulfuric acid or salts, such as alkali metal chlorides, alkaline earth metal chlorides or the like, are usually used as an extraction agent for the extractive distillation of aqueous hydrogen halide starting solutions.

During technical implementation, extractive distillation is usually carried out as extractive rectification, that is, the dilute extraction-agent-containing hydrogen halide solution is fed from top to bottom, that is, in counter-flow to the vapor rising from below which is produced at the bottom of the distillation column by evaporation, in a distillation column. In this case, owing to the hygroscopic properties of the extraction agent, the aqueous extraction-agent-containing solution takes up water from the vapor phase, while at the same time hydrogen halide gas is expelled from the aqueous solution into the vapor phase and thus the vapor phase is concentrated in respect of the hydrogen halide. For this reason, in the upper portion or at the head of the distillation column, depending on the procedure, a hydrogen halide vapor (that is, a mixture of hydrogen halide gas and water) or pure hydrogen halide gas is obtained, which is removed from the head of the distillation column and then, in the case of a hydrogen halide vapor, is usually condensed to form a concentrated aqueous hydrogen halide solution, which has a higher concentration than the dilute aqueous hydrogen halide starting solution which is used, or, in the case of a hydrogen halide gas which still contains small amounts of water, is usually dried in one or more condensation steps.

However, the concentration of the extraction agent in the extraction-agent-containing solution which flows from top to bottom during extractive distillation decreases owing to the absorption of water from the vapor phase which is fed in counter-flow, so that the solution removed in the lower portion or at the bottom of the distillation column has a lower extraction-agent concentration than the extraction-agent-containing solution introduced at the upper end of the distillation column. In order to re-use the extraction-agent-containing solution or for it to be able to be recirculated, said solution therefore has to be concentrated with respect to the extraction agent after discharge from the bottom of the distillation column. In practice, this usually takes place such that the dilute solution removed from the bottom of the distillation column is concentrated in an evaporation device arranged downstream of the distillation column by evaporating water, before the thus concentrated extraction-agent-containing solution is returned to the distillation device.

In this case, concentrating the extraction-agent-containing solution in the evaporation device is usually carried out in a multi-stage manner, that, in a plurality of cascaded evaporation stages, for energy reasons. Owing to the increase in the boiling point of the solution, which occurs owing to the extraction agent contained in the solution to be concentrated, the evaporation of the solution is typically carried out at atmospheric pressure or at sub-atmospheric pressure in order to keep the boiling point available at the present pressure as low as possible and thus to keep the energy level required for evaporating water as low as possible. Since the concentration of the extraction agent is increased from stage to stage in the multi-stage evaporation device and therefore the boiling point of the solution increases from stage to stage at a predetermined pressure, the pressure usually decreases, for the above-mentioned reasons, from each of the evaporation stages to the subsequent evaporation stage in each case, that is, each evaporation step is carried out at a lower pressure than the previous evaporation step in each case. As a result, the exhaust vapor from a previous stage can be utilized as energy for heating the next stage, which is operated at a lower pressure. However, a drawback of a multi-stage procedure of this type is that the evaporation device is very complex in terms of equipment owing to the plurality of evaporation stages, and this not only requires high investment costs for the evaporation device, inter alia owing to the required cladding of the individual evaporation stages with expensive cladding materials, so that the evaporation device can withstand the corrosive action of the solutions to be reprocessed, but also in particular entails high operating and maintenance costs and also requires technically complex measures for producing and maintaining negative pressure or a vacuum. Furthermore, in a multi-stage evaporation device of this type, complex devices are required for reliable open-loop and closed-loop control of the operating conditions, such as, in particular, the pressure and the temperature of the individual evaporation stages. All in all, an evaporation device of this type is therefore highly complex in terms of equipment and thus also has a high potential susceptibility to faults, and the operating costs thereof are high. As a result, there is a need to reduce the complexity of the evaporation device required for concentrating the extraction-agent-containing solution.

A further drawback of a multi-stage evaporation device, when using salt as an extraction agent, is that, in particular, in the final evaporation stages, there is a risk of undesired crystallization of the extraction agent. As set out above, the pressure is usually reduced from each of the evaporation stages to the subsequent evaporation stage in each case, and typically specifically such that the boiling temperature of the solution at the pressure prevailing in each case reduces from evaporation stage to evaporation stage. For this reason, in particular in the final evaporation stages there is the risk of undesired crystallization of the extraction agent, which may lead to the evaporation device and devices which are downstream thereof in the process becoming blocked and thus may lead to complete failure of the installation. In addition, the crystallized extraction agent has to be removed in a complex manner, and this requires a high level of technical complexity and high personnel costs, as well as periods of downtime for the installation.

SUMMARY OF THE INVENTION

It is accordingly an object of the invention to provide a method and a system which overcome the above-mentioned and other disadvantages of the heretofore-known devices and methods of this general type and which provide for a method of concentrating an aqueous hydrogen halide starting solution on the basis of extractive distillation which is energy-efficient and at the same time can be carried out in an installation which is cost-effective and comparatively simple in terms of equipment, and in which crystallization of the extraction agent is reliably prevented when salt is used as the extraction agent.

With the foregoing and other objects in view there is provided, in accordance with the invention, a method of concentrating an aqueous hydrogen halide starting solution, the method comprising the steps of:

extractive distillation of the aqueous hydrogen halide starting solution in the presence of an extraction agent in a distillation device;

removing one or both of a hydrogen halide vapor and hydrogen halide gas from an upper portion of the distillation device;

removing an extraction-agent-containing solution from a lower portion of the distillation device;

concentrating the extraction-agent-containing solution removed from the lower portion of the distillation device in an evaporation device at an evaporation pressure that is greater than an atmospheric pressure to form a concentrated extraction-agent-containing solution; and returning the concentrated extraction-agent-containing solution from the evaporation device to the distillation device.

In other words, the objects of the invention are achieved with a method for concentrating an aqueous hydrogen halide starting solution, in particular hydrochloric acid, in which the extraction-agent-containing solution removed from the lower portion of the distillation device is concentrated in the evaporation device by evaporation at a pressure which is greater than atmospheric pressure.

This solution is based on the knowledge that a method for concentrating an aqueous hydrogen halide solution by extractive distillation of the aqueous hydrogen halide starting solution in the presence of an extraction agent in a distillation device is not only energy-efficient but can also be carried out in an installation which is cost-effective and comparatively simple in terms of equipment, namely, in an installation having a single-stage evaporation stage for concentrating the recirculated extraction-agent-containing solution when the extraction-agent-containing solution removed from the lower portion of the distillation device is concentrated in an evaporation device which is operated at a pressure which is greater than atmospheric pressure. Owing to the possibility of carrying out such a method using a single-stage evaporation device for concentrating the extraction-agent-containing solution, the installation required for operating the method according to the invention is simpler in terms of equipment and, because of this, is considerably more cost-effective than the installations known from the prior art, which comprise a plurality of successive evaporation stages, the components of which all have to be equipped with expensive cladding material in order to protect them against the corrosive action of the solution to be concentrated. In addition, because of this, the operating and maintenance costs of the installation required for carrying out the method according to the invention are significantly lower than for the methods known from the prior art. Furthermore, for these reasons, the method according to the invention requires simpler and less complex open-loop and closed-loop control in order for it to be carried out than the methods known from the prior art. In particular, for carrying out the method according to the invention, devices for the production, maintenance and open-loop and closed-loop control of a negative pressure or a vacuum in the evaporation device are not required for concentrating the extraction-agent-containing solution.

A further advantage of the method according to the invention is that, in this method, crystallization of the extraction agent is reliably prevented when concentrating the solution in the evaporation device, even when salt is used as the extraction agent. This is because the concentration of the extraction-agent-containing solution in the evaporation device takes place at a pressure which is greater than atmospheric pressure, so that, as a result, the highest concentration of the extraction agent can be achieved at an evaporation temperature which is comparatively high, owing to the increased pressure compared with the methods known from the prior art which are carried out at relatively low pressures, which is why the risk of crystallisation is prevented or at least considerably reduced, since the solubility of the above-mentioned salts in aqueous or aqueous acidic solution also increases as the temperature increases. Therefore, owing to the comparatively high solubility of the salts at the high evaporation temperature, the extraction-agent-containing solution can be concentrated up to a high salt content without the risk of crystallization.

A further essential advantage of the method according to the invention is that, when concentrating the recirculated extraction-agent-containing solution in the evaporation device, owing to the pressure prevailing during evaporation, in addition to the concentrated extraction-agent-containing solution steam and/or exhaust vapor are produced, which have a correspondingly high pressure and a correspondingly high temperature and thus a high usable energy content. Owing to the comparatively high pressure and the comparatively high temperature of the exhaust vapor, it can be used to provide the necessary energy for producing vapor in the lower region of the distillation device. This can, for example, be carried out by a partial stream of the solution which is accumulating at the bottom of the distillation device being brought into direct or more preferably indirect contact with the exhaust vapor accumulating in the evaporation device for concentrating the extraction-agent-containing solution in a heat exchanger, the exhaust vapor being condensed and the solution being evaporated owing to the heat transferred thereby, which solution is then returned to the lower region of the distillation device as vapor.

In the method according to the invention for concentrating an aqueous hydrogen halide starting solution, it is clear that not only starting solutions consisting of water and acid can be used, but also in particular aqueous hydrogen halide solutions which are additionally charged with one or more other dissolved substances and/or solids in suspension.

According to the invention, the extraction-agent-containing solution removed from the lower portion of the distillation device is concentrated in the evaporation device by evaporation at a pressure which is greater than atmospheric pressure. In order to make it possible to use exhaust vapor accumulating in the evaporation device during concentration of the extraction-agent-containing solution particularly efficiently and optimally, in a development of the concept of the invention it is proposed that the extraction-agent-containing solution in the evaporation device is carried out at a higher pressure than extractive distillation in the distillation device. In this case, the exhaust vapor accumulating in the evaporation device can be particularly effectively used to provide the necessary energy for producing vapor in the lower region of the distillation device.

Good results both in terms of the energy efficiency of the method according to the invention and in terms of the simplicity in terms of equipment of the installation required for operating the method according to the invention, reliable prevention of crystallization when concentrating the extraction-agent-containing solution, even when using salt as an extraction agent, and the usability of the exhaust vapor developing in the evaporation device are obtained in particular if the concentration of the extraction-agent-containing solution in the evaporation device is carried out at an absolute pressure of greater than the normal pressure prevailing in the meteorological means, which pressure is, at sea level, 0.101325 MPa, and up to 1.5 MPa, preferably from 0.15 MPa to 1 MPa, more preferably from 0.2 to 0.5 MPa, particularly preferably from 0.25 MPa to 0.4 MPa and most preferably from 0.3 to 0.35 MPa.

The absolute pressure in the evaporation device is understood to mean, within the meaning of the present invention, the pressure prevailing in the evaporation device during evaporation, which the extraction-agent-containing solution to be concentrated is under and which is equal to the evaporation pressure or the pressure of the developing exhaust vapor. If this pressure were to vary at different points in the evaporation device, that, if it were not constant throughout the evaporation device, this is understood to be the average pressure which the extraction-agent-containing solution to be concentrated is under and which is equal to the pressure of the exhaust vapor developing in the evaporation device, in this case the pressure being, according to the invention, greater than the normal pressure prevailing in the meteorological means, which pressure is, at sea level, 0.101325 MPa, at any point in the evaporation device at which the extraction-agent-containing solution is located. If the evaporation device is multi-stage, which is not preferable according to the present invention, this is understood to be the average pressure which the extraction-agent-containing solution to be concentrated is under and which is equal to the pressure of the gas mixture which develops by combining the exhaust vapors developing in the individual stages, in this case the pressure being, according to the invention, greater than the normal pressure prevailing in the meteorological means, which pressure is, at sea level, 0.101325 MPa, at any point in the evaporation device at which the extraction-agent-containing solution is located.

The temperature prevailing during operation of the evaporation device for concentrating the extraction-agent-containing solution corresponds to the boiling temperature or evaporation temperature of the solution, that is, the temperature at which water is evaporated out of the solution at the pressure prevailing in the evaporation device. For this reason, the temperature during concentration of the extraction-agent-containing solution in the evaporation device is correlated with the pressure set in the evaporation device and is dependent on the type of extraction agent. In line with the above-stated preferred pressure ranges in the evaporation device, the concentration of the extraction-agent-containing solution in the evaporation device is therefore preferably carried out at a temperature of from 80 to 300° C., particularly good results being obtained if the concentration of the extraction-agent-containing solution in the evaporation device is carried out at a temperature of from 100 to 260° C., more preferably of from 120 to 220° C., particularly preferably of from 140 to 200° C. and most preferably of from 160 to 180° C.

In principle, the present invention is not restricted in terms of the type of evaporation device which is used, so that any evaporation device known to a person skilled in the art can be used for concentrating the extraction-agent-containing solution. Good results are in particular achieved if the concentration of the extraction-agent-containing solution is carried out in an evaporation device which comprises at least one evaporator which is selected from the group consisting of natural circulation evaporators, forced circulation evaporators, kettle evaporators, falling film evaporators and any combination of the above-mentioned evaporators. Preferably, the evaporation device in which the concentration of the extraction-agent-containing solution is carried out consists of an evaporator which is selected from the group consisting of forced circulation evaporators, kettle evaporators, falling film evaporators and any combination of the above-mentioned evaporators. If the evaporation device comprises a forced circulation evaporator, a flash evaporator may also be connected downstream thereof.

Although, in principle, it is possible within the context of the present invention for the evaporation device for concentrating the extraction-agent-containing solution to be multi-stage, according to a particularly preferable embodiment of the invention it is provided that the concentration of the extraction-agent-containing solution is carried out in an evaporation device which is single-stage. As a result, the effects according to the invention, namely the simplicity, in terms of equipment, of the installation required for carrying out the method, energy efficiency, reliable prevention of crystallization of the extraction agent during concentration in the evaporation device and the possibility of using the exhaust vapor developing in the evaporation device for producing the vapor required for operating the distillation device, are achieved to a particularly high extent. Within the meaning of the present invention, a single-stage evaporation device is understood such that the evaporation device only has one evaporator.

In an alternative, if less preferable, embodiment of the present invention, the evaporation device is multi-stage.

In order to protect the evaporation device against the corrosive action of the extraction-agent-containing solution, in a development of the concept of the invention it is proposed that the concentration of the extraction-agent-containing solution is carried out in a evaporation device of which the inner surface consists of or is clad with, at least in portions, a material which is selected from the group consisting of graphite, silicon carbide, carbon-fiber-containing composite materials, fluorinated polymers, enamels, glass, rubberized steels and any combination of two or more of the above-mentioned materials. In order to fully achieve the above-mentioned effect, it is preferable for all the inner surfaces of the evaporation device which come into contact with the extraction-agent-containing solution to be completely clad with one of the above-mentioned materials.

Good results are in particular achieved with this embodiment if the cladding material is selected from the group consisting of graphite, silicon carbide, polytetrafluoroethylene (PTFE) and any combination of two or more of the above-mentioned materials. If graphite is used, which is preferable, graphite which is impregnated with resin, for example, phenol resin, is preferably used. In addition, polytetrafluoroethylene, which is cost-effective and is applied to the inner surface(s) as a coating or as a loose film, and can be used at temperatures of up to approximately 270° C., is also preferable. By contrast, silicon carbide is relatively expensive and therefore is only preferable for comparatively high temperatures of, for example, greater than 270° C.

According to the invention, an extraction-agent-containing solution is recirculated between the distillation device and the evaporation device in the method according to the invention. In this case, the aqueous hydrogen halide starting solution to be concentrated can be mixed with the recirculated extraction-agent-containing solution before it is fed to the distillation device, and then this mixture introduced into the distillation device, and preferably into the central or upper portion of the distillation device. Alternatively, it is also possible for the aqueous hydrogen halide starting solution, which is to be concentrated, to be fed to the distillation device, and preferably to the central or upper portion of the distillation device, separately from the recirculated extraction-agent-containing solution, which is also preferably introduced into the central or upper portion of the distillation device. The extraction agent and the aqueous extraction-agent-containing solution are introduced into the central or upper portion of the distillation device in order to be fed in counter-flow to the hydrogen halide vapor rising from the bottom towards the top.

A further advantage of the method according to the invention is that said method has no particular restrictions on the extraction agent concentration of the extraction-agent-containing solution upstream and downstream of the evaporation device. For example, an extraction-agent-containing solution at a concentration of extraction agent in the solution of from 30 to 60 wt. %, preferably of from 35 to 55 wt. % and more preferably of from 40 to 50 wt. %, can be removed from the lower portion of the distillation device.

It is further preferable for the extraction-agent-containing solution to be concentrated in the evaporation device up to a concentration of extraction agent in the solution of from 40 to 80 wt. %, preferably of from 50 to 70 wt. % and more preferably of from 55 to 65 wt. %. The above-mentioned values relate to the concentration of extraction agent in the solution at the outlet of the evaporation device.

In principle, the present invention is not restricted in terms of the extraction agent used, as long as said agent selectively increases the volatility of water or hydrogen halide in a water- or hydrogen-halide-containing solution and preferably does not form an azeotrope with any of the substances to be separated. Furthermore, it is preferable for the extraction agent to have a lower vapor pressure than water and hydrogen halide. Good results are in particular achieved if the extraction agent contains or consists of at least one substance selected from the group consisting of sulfuric acid, alkali metal halides, alkaline earth metal halides, aluminum halides, ammonium halides and any combination of two or more of the above-mentioned components.

According to a preferred embodiment of the present invention, an extraction agent is used which contains or preferably consists of at least one substance selected from the group consisting of sulfuric acid, lithium chloride, sodium chloride, potassium chloride, magnesium chloride, calcium chloride, aluminum chloride, ammonium chloride, lithium bromide, sodium bromide, potassium bromide, magnesium bromide, calcium bromide, aluminum bromide, ammonium bromide and any combination of two or more of the above-mentioned components. The above-mentioned bromide salts are preferred as extraction agents, particularly if hydrogen bromide is produced from an aqueous hydrogen bromide starting solution in the method.

Particularly preferably, the extraction agent contains or consists of at least one substance selected from the group consisting of sulfuric acid, magnesium chloride, calcium chloride and any combination of two or more of the above-mentioned components.

In an exemplary embodiment of the present invention, sulfuric acid is used as the extraction agent, a sulfuric-acid-containing solution having a concentration of sulfuric acid in the solution of from 45 to 60 wt. % and preferably of from 50 to 55 wt. % being removed from the lower portion of the distillation device, this solution being concentrated in the evaporation device up to a concentration of sulfuric acid in the solution of from 50 to 75 wt. % and preferably of from 55 to 65 wt. %, and this concentrated solution being returned to the distillation device.

In an alternative embodiment of the present invention, magnesium chloride is used as the extraction agent, a magnesium-chloride-containing solution having a concentration of magnesium chloride in the solution of from 25 to 40 wt. % and preferably of from 30 to 35 wt. % being removed from the lower portion of the distillation device, this solution being concentrated in the evaporation device up to a concentration of magnesium chloride in the solution of from 30 to 50 wt. % and preferably of from 35 to 45 wt. %, and this concentrated solution being returned to the distillation device.

In an alternative embodiment of the present invention, calcium chloride is used as the extraction agent, a calcium-chloride-containing solution having a concentration of calcium chloride in the solution of from 35 to 50 wt. % and preferably of from 40 to 45 wt. % being removed from the lower portion of the distillation device, this solution being concentrated in the evaporation device up to a concentration of calcium chloride in the solution of from 40 to 65 wt. % and preferably of from 45 to 55 wt. %, and this concentrated solution being returned to the distillation device.

Preferably, the concentrated extraction-agent-containing solution is returned to the upper and/or central portion of the distillation device after exiting the evaporation device.

According to another, particularly preferred embodiment of the present invention, the exhaust vapor formed by evaporation in the evaporation device during concentration of the extraction-agent-containing solution is used to heat the distillation device. This can, even though it is slightly less preferable, take place by direct heating, namely by, for example, introducing the exhaust vapor as a heating gas into the lower portion of the distillation device, or can preferably take place by indirect heating, namely by the exhaust vapor heating a bottom product of the distillation device in a heat exchanger.

The last-mentioned variant is preferably carried out by the exhaust vapor formed in the evaporation device being removed from the evaporation device and fed into a heat exchanger and being condensed therein, and the extraction-agent-containing solution which is removed from the lower portion of the distillation device also being fed to the heat exchanger, the extraction-agent-containing solution which is fed to the heat exchanger being evaporated at least in part by the released condensation heat and said vapor being returned to the lower portion of the distillation device.

In the above embodiment, after exiting the evaporation device and until heating, the exhaust vapor is kept at the pressure which the exhaust vapor is under during formation by evaporation in the evaporation device, that is, at the pressure of the exhaust vapor at the outlet of the evaporation device. As a result, the energy contained in the exhaust vapor is particularly well exploited, and heat is efficiently transferred in a comparatively small heat exchanger. However, a throttle can also alternatively be used to relieve the pressure of the exhaust vapor.

In a development of the concept of the invention, it is proposed that a partial stream or the complete stream of the exhaust vapor which is condensed in the heat exchanger be brought into contact with the exhaust vapor which is removed from the evaporation device before it is introduced into the heat exchanger in order to form saturated vapor from the exhaust vapor which is removed from the evaporation device before it is introduced into the heat exchanger.

Instead of or in addition to utilizing the exhaust vapor, an evaporator can be provided downstream of the distillation device and can be heated with live vapor in order to produce at least part of the vapor required for operating the distillation device.

In principle, the present invention has no particular restrictions on the pressure at which the extractive distillation is carried out. As set out above, it is preferable for the concentration of the extraction-agent-containing solution in the evaporation device to be carried out at a higher temperature than the extractive distillation in the distillation device. Therefore, it is preferable for the extractive distillation to be carried out at atmospheric or sub-atmospheric pressure and in particular at an absolute pressure of 0.01 to 0.12 MPa and preferably of 0.05 MPa to 0.12 MPa, which is practical in particular if aqueous hydrogen halide solution which is concentrated in the method, in particular concentrated aqueous hydrochloric acid, is intended to be produced. If, however, hydrogen halide gas, in particular hydrogen chloride gas, is intended to be produced, it is preferable for the extractive distillation to be carried out at super-atmospheric pressure, and in particular at an absolute pressure of from 0.10 to 0.30 MPa and preferably of from 0.10 to 0.15 MPa.

Preferably, the extractive distillation is carried out such that the temperature in the lower portion of the distillation device, that is, under steady-state operating conditions, is 50 to 200° C. and preferably 90 to 140° C.

In addition, it is preferable for the extractive distillation to be carried out such that the temperature in the upper portion of the distillation device, that is, under steady-state operating conditions, is 30 to 190° C. and preferably 70 to 130° C.

All devices known to a person skilled in the art for this purpose, such as, in particular, distillation columns and distillation towers, are a possibility for a distillation device.

In principle, the present invention has no particular restrictions on the hydrogen halide content of the hydrogen halide starting solution. In particular, hydrogen halide starting solutions having a hydrogen halide content of from 1 to less than 35 wt. % and preferably of from 10 to 15 wt. % are used.

The present invention also has no particular restrictions on the concentration of the hydrogen halide content of the hydrogen halide vapor removed from the upper portion of the distillation device and/or the hydrogen halide gas removed from the upper portion of the distillation device, and a preferred hydrogen halide content is, for example, at least 30 wt. % and preferably of from 34 to 38 wt. % in the case of hydrogen halide vapor and greater than 97 wt. %, preferably at least 98 wt. % and more preferably at least 99 wt. %, in the case of hydrogen halide gas. In this case, hydrogen chloride vapor, hydrogen chloride gas, hydrogen bromide vapor and hydrogen bromide gas come into particular consideration as a hydrogen halide vapor or gas.

In a development of the concept of the invention, it is proposed that the hydrogen halide vapor removed from the upper portion of the distillation device and/or the hydrogen halide gas removed from the upper portion of the distillation device be dehydrated or dried, which preferably takes place by condensation. In this case, the dehydration and in particular condensation may be single-stage or multi-stage. Therefore, the hydrogen halide content of the product is increased accordingly, specifically to 32 to 40 wt. %, for example, and preferably to 35 to 40 wt. %, for example, approximately 36 wt. %, in the case of a concentrated aqueous hydrogen halide solution and greater than 99 wt. %, preferably at least 99.5 wt. % and more preferably at least 99.9 wt. % in the case of hydrogen halide gas, preferably hydrogen chloride gas.

The present invention also relates to an installation for concentrating an aqueous hydrogen halide starting solution, in particular hydrochloric acid, comprising:

a distillation device for the extractive distillation of the aqueous hydrogen halide starting solution in the presence of an extraction agent, at least one removal line on the upper portion of the distillation device for removing concentrated hydrogen halide vapor and/or hydrogen halide gas from the upper portion of the distillation device, at least one removal line on the lower portion of the distillation device for removing an extraction-agent-containing solution from the lower portion of the distillation device, an evaporation device for concentrating the extraction-agent-containing solution which is removed from the lower portion of the distillation device, and a return line for returning concentrated extraction-agent-containing solution removed from the evaporation device to the distillation device, wherein the evaporation device is designed such that the extraction-agent-containing solution removed from the lower portion of the distillation device is concentrated in the evaporation device by evaporation at a pressure which is greater than atmospheric pressure.

According to a preferred embodiment of the present invention, the evaporation device is designed such that the extraction-agent-containing solution is concentrated by evaporation therein at an absolute pressure of greater than the normal pressure prevailing in the meteorological means, which pressure is, at sea level, 0.101325 MPa, and up to 1.5 MPa, preferably of from 0.15 MPa to 1 MPa, more preferably of from 0.2 to 0.5 MPa, particularly preferably of from 0.25 MPa to 0.4 MPa and most preferably of from 0.3 to 0.35 MPa.

In a development of the concept of the invention it is proposed that the evaporation device is designed such that the extraction-agent-containing solution is concentrated in the evaporation device at a temperature of from 80 to 300° C., preferably of from 100 to 260° C., more preferably of from 120 to 220° C., particularly preferably of from 140 to 200° C. and most preferably of from 160 to 180° C.

Furthermore, it is preferable for the evaporation device to comprise at least one evaporator which is selected from the group consisting of natural circulation evaporators, forced circulation evaporators, kettle evaporators, falling film evaporators and any combination of the above-mentioned evaporators.

According to a particularly preferred embodiment of the present invention, it is provided that the evaporation device is single-stage.

In an alternative, if less preferred, embodiment of the present invention, the evaporation device is multi-stage evaporator.

Preferably, the inner surface of the evaporation device consists, at least in portions, of a material or the inner surface of the evaporation device is dad, at least in portions, with a material which is selected from the group consisting of graphite, silicon carbide, carbon-fiber-containing composite materials, fluorinated polymers, enamels, glass, rubberized steels and any combination of two or more of the above-mentioned materials. Particularly preferably, all the inner surfaces of the evaporation device which come into contact with the extraction-agent-containing solution are completely clad with one of the above-mentioned materials.

Preferably, the at least one return line for returning the extraction-agent-containing solution feeds said solution into the upper and/or central portion of the distillation device from the evaporation device after concentration.

In a development of the concept of the invention, it is proposed that the installation comprises at least one line via which the exhaust vapor formed by evaporation in the evaporation device is brought into direct or indirect contact with the extraction-agent-containing solution from the lower portion of the distillation device in order to heat the distillation device.

In the first case, a line for introducing the exhaust vapor directly into the lower portion of the distillation device may, for example, be provided.

However, in the second case, the heating can be carried out, for example, by means of a heat exchanger. In this embodiment, the line preferably discharges into a heat exchanger which is designed such that the exhaust vapor is condensed therein, a feed line also discharging into the heat exchanger, via which line extraction-agent-containing solution removed from the lower portion of the distillation device is fed to said heat exchanger, the heat exchanger being designed such that the extraction-agent-containing solution fed to the heat exchanger via the feed line is evaporated by the released condensation heat, and the heat exchanger comprising a discharge line via which the vapor formed in the heat exchanger is returned to the lower portion of the distillation device.

Preferably, the heat exchanger comprises an additional discharge line and the installation comprises an additional heat exchanger, the discharge line of the heat exchanger discharging into the additional heat exchanger and the additional heat exchanger also comprising a feed line via which exhaust vapor removed from the evaporation device is fed to said heat exchanger in order to form saturated vapor from the exhaust vapor which is removed from the evaporation device before it is introduced into the heat exchanger.

Instead of or in addition to utilising the exhaust vapor, an evaporator may be provided downstream of the distillation device, which evaporator is heated with live vapor in order to produce at least part of the vapor required for operating the distillation device.

It is further provided that the removal line on the upper portion of the distillation device for removing concentrated hydrogen halide vapor and/or concentrated hydrogen halide gas discharges into a dehydration device and preferably into a condensation device.

As set out above, the distillation device may, for example, comprise or consist of a distillation column or a distillation tower.

Other features which are considered as characteristic for the invention are set forth in the appended claims.

Although the invention is illustrated and described herein as embodied in a method for concentrating aqueous hydrogen halide solutions, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The single FIGURE is a schematic view of an installation for concentrating an aqueous hydrogen halide starting solution.

DETAILED DESCRIPTION OF THE INVENTION

Referring now to the sole FIGURE of the drawing in detail there is shown an installation 10 for concentrating an aqueous hydrogen halide starting solution. The installation 10 comprises a distillation device 12, here a rectification column 12, an evaporation device 14 and a heat exchanger 16 for heating the bottom product of the rectification column 12.

A feed line 18 for extraction-agent-containing aqueous hydrogen halide solution leads into the upper portion of the rectification column 12, which solution has been previously produced in a mixing apparatus 20 by mixing together (1) an aqueous hydrogen halide starting solution which is fed to the mixing apparatus 20 via a feed line 18' and (2) a concentrated aqueous extraction-agent-containing solution which comes from the evaporation device 14 and is fed to the mixing apparatus 20 via a return line 22.

A removal line 24 for extraction-agent-containing solution is provided on the lower portion or bottom of the rectification column 12, which line is provided with a pump 26 and feeds into the evaporation device 14. On one hand, the return line 22 leads out of the evaporation device 14 into the mixing apparatus 20, and on the other hand a feed line for exhaust vapor 28 leads from the evaporation device 14 into the heat exchanger 16. Exhaust vapor is condensed therein and is removed from the heat exchanger 16 as condensate via the discharge line for exhaust vapor 30, where it is prepared in a post-processing device 32 and is finally removed from the installation 10.

A feed line 34 for extraction-agent-containing solution also leads into the heat exchanger 16, which line 34 discharges from the removal line 24 and thus feeds a partial stream of the aqueous extraction-agent-containing solution removed from the bottom of the rectification column 12 into the heat exchanger 16. Said solution is evaporated in the heat exchanger 16 and is returned to the lower portion of the rectification column 12 via the discharge line 36.

A removal line 38 is provided on the upper portion or head of the rectification column 12, via which line 38 concentrated hydrogen halide vapor and/or hydrogen halide gas is fed to a condensation device 40, from which concentrated hydrogen halide solution and/or hydrogen halide gas is removed from the installation 10 via the product discharge line 42. In addition, a return line 44 leads from the condensation device 40 back into the upper portion of the rectification column 12.

During the operation of the installation 10, extraction-agent-containing hydrogen halide starting solution is fed to the upper portion of the rectification column 12, which solution has been produced by mixing together the aqueous hydrogen halide starting solution which is fed to the mixing apparatus 20 via the feed line 18' and the concentrated aqueous extraction-agent-containing solution which originates in the evaporation device 14 and is fed to the mixing apparatus 20 via the return line 22. The mixture flows downwards in the rectification column 12 and thus in counter-flow to vapor rising from the lower portion of the rectification column 12, which vapor is produced at the bottom of the distillation column by evaporation. In this case, owing to the hygroscopic properties of the extraction agent, the aqueous extraction-agent-containing solution takes up water from the vapor phase, while at the same time hydrogen halide gas is expelled from the aqueous solution into the vapor phase, and thus the vapor phase is concentrated with respect to the hydrogen halide. For this reason, in the upper portion or at the head of the rectification column 12, depending on the procedure, a hydrogen halide vapor or pure hydrogen halide gas is obtained, which is removed from the head of the rectification column 12, is dehydrated and dried by condensation in the condensation device 40 and is finally removed from the installation 10.

An extraction-agent-containing solution is removed from the lower end of the rectification column 12 via a removal line 24, from which one partial stream is fed into the heat exchanger 16 via the feed line 34, and the other partial stream is compressed to 0.3 MPa, for example, via the removal line 24 and the pump 26 and is fed to the evaporation device 14. In the evaporation device 14, the extraction-agent-containing solution is concentrated by evaporation at an absolute pressure of 0.3 MPa, the concentrated extraction-agent-containing solution being returned to the mixing apparatus 20, and finally the rectification column 12, via the return line 22.

The exhaust vapor developing in the evaporation device 14 is fed via the feed line 28 into the heat exchanger 16, where it is condensed and from where it is finally fed into the post-processing device 32, prepared therein and finally removed from the installation 10 at this point. Owing to the heat released due to the condensation of the exhaust vapor, the extraction-agent-containing solution which is fed from the bottom of the rectification column 12 to the heat exchanger 16 via the feed line 34 evaporates at least in part and is returned to the lower portion of the rectification column 12 as vapor via the line 36.

In one embodiment of the invention, the heat exchanger may comprise an additional discharge line and the installation may comprise an additional heat exchanger. The additional discharge line of the heat exchanger discharges into the additional heat exchanger, and the additional heat exchanger also includes a feed line via which exhaust vapor removed from the evaporation device is fed to said additional heat exchanger in order to form saturated vapor from the exhaust vapor, which is removed from the evaporation device prior to introduction thereof into the additional heat exchanger.

The following is a summary list of reference numerals and the corresponding structure used in the above description of the invention:
  10 installation
  12 rectification column/distillation device
  14 evaporation device
  16 heat exchanger
  18, 18' fluid feed line
  20 mixing apparatus
  22 return line for extraction-agent-containing solution
  24 removal line for extraction-agent-containing solution
  26 pump
  28 feed line for exhaust vapor
  30 discharge line for exhaust vapor
  32 post-processing device
  34 feed line for extraction-agent-containing solution
  36 discharge line for vapor mixture from extraction-agent-containing solution
  38 removal line for concentrated hydrogen halide vapor and/or hydrogen halide gas
  40 condensation device/dehydration device
  42 product discharge line
  44 return line for condensation product

The invention claimed is:

1. An installation for concentrating an aqueous hydrogen halide starting solution, the installation comprising:
  a distillation device configured for an extractive distillation of the aqueous hydrogen halide starting solution in the presence of an extraction agent, said distillation device having a lower portion and an upper portion;
  at least one removal line at said upper portion of said distillation device for removing concentrated hydrogen halide vapor and/or hydrogen halide gas from said upper portion of said distillation device;

at least one removal line at said lower portion of said distillation device for removing an extraction-agent-containing solution from said lower portion of said distillation device;

an evaporation device for concentrating the extraction-agent-containing solution removed from said lower portion of said distillation device, said evaporation device being configured to concentrate the extraction-agent-containing solution removed from said lower portion of said distillation device by evaporation at a pressure that is greater than atmospheric pressure thereby forming a concentrated extraction-agent-containing solution; and a return line for returning said concentrated extraction-agent-containing solution removed from said evaporation device to said distillation device, wherein the return line does not have a pump, wherein said installation is configured such that concentration of the extraction-agent-containing solution in the evaporation device is carried out at a higher pressure than the extractive distillation in the distillation device.

2. The installation according to claim 1, wherein said evaporation device is configured to concentrate the extraction-agent-containing solution by evaporation at an absolute pressure of from 0.15 MPa to 1 MPa.

3. The installation according to claim 1, wherein said evaporation device is configured to concentrate the extraction-agent-containing solution at a temperature of from 80 to 300° C.

4. The installation according to claim 1, wherein said evaporation device comprises at least one evaporator selected from the group consisting of natural circulation evaporators, forced circulation evaporators, kettle evaporators, falling film evaporators and any combination thereof.

5. The installation according to claim 1, wherein an inner surface of said evaporation device consists of or is clad with, at least in portions thereof, a material selected from the group consisting of graphite, silicon carbide, carbon-fiber-containing composite materials, fluorinated polymers, enamels, glass, rubberized steels and any combination of two or more of the above-mentioned materials.

6. The installation according to claim 1, wherein said return line for returning the extraction-agent-containing solution is connected to feed the solution into said upper and/or a central portion of said distillation device from the evaporation device after concentration.

7. The installation according to claim 1, which further comprises at least one line for bringing an exhaust vapor formed by evaporation in said evaporation device into direct contact in a heat exchanger with the extraction-agent-containing solution from said lower portion of said distillation device in order to heat said distillation device.

8. The installation according to claim 1, which further comprises at least one line for bringing an exhaust vapor formed by evaporation in said evaporation device into indirect contact in a heat exchanger with the extraction-agent-containing solution from said lower portion of said distillation device in order to heat said distillation device.

9. The installation according to claim 8, wherein the at least one line for bringing the exhaust vapor formed by evaporation discharges into a heat exchanger configured to condense the exhaust vapor therein, a feed line also discharges extraction-agent-containing solution removed from the lower portion of the distillation device into said heat exchanger, said heat exchanger being configured to evaporate the extraction-agent-containing solution fed to said heat exchanger via said feed line by released condensation heat, and said heat exchanger including a discharge line for returning the vapor formed in said heat exchanger to said lower portion of said distillation device.

10. The installation according to claim 1, wherein said removal line at said upper portion of said distillation device for removing concentrated hydrogen halide vapor and/or concentrated hydrogen halide gas discharges into a dehydration device and, optionally, into a condensation device.

11. The installation according to claim 1, wherein said distillation device comprises a distillation column or a distillation tower.

12. The installation according to claim 1, said installation being configured such that the higher pressure in the evaporation device exceeds a lower pressure in the distillation device by at least 0.005 MPa.

13. The installation according to claim 1, wherein the at least one removal line at said lower portion of said distillation device for removing an extraction-agent-containing solution from said lower portion of said distillation device comprises a pump to transfer fluid.

14. A method of concentrating an aqueous hydrogen halide starting solution in an installation according to claim 1, the method comprising the steps of:

extractive distillation of the aqueous hydrogen halide starting solution in the presence of an extraction agent in the distillation device;

removing one or both of a hydrogen halide vapor and hydrogen halide gas from the upper portion of the distillation device;

removing an extraction-agent-containing solution from the lower portion of the distillation device;

concentrating the extraction-agent-containing solution removed from the lower portion of the distillation device in the evaporation device at an evaporation pressure that is greater than an atmospheric pressure to form a concentrated extraction-agent-containing solution; and returning the concentrated extraction-agent-containing solution from the evaporation device to the distillation device.

15. The method according to claim 14, which comprises carrying out the concentration of the extraction-agent-containing solution in the evaporation device at a higher pressure than the extractive distillation in the distillation device.

16. The method according to claim 14, which comprises carrying out the concentration of the extraction-agent-containing solution in the evaporation device at an absolute pressure of 0.15 MPa to 1 MPa.

17. The method according to claim 14, wherein the concentration of the extraction-agent-containing solution in the evaporation device is carried out at a temperature of between 80 and 300° C.

18. The method according to claim 14, which comprises carrying out the concentration of the extraction-agent-containing solution in an evaporation device which comprises at least one evaporator selected from the group consisting of natural circulation evaporators, forced circulation evaporators, kettle evaporators, falling film evaporators and any combination thereof.

19. The method according to claim 14, which comprises carrying out the concentration of the extraction-agent-containing solution in a evaporation device having an inner surface that consists of, or is cladded with, at least in portions, a material selected from the group consisting of graphite, silicon carbide, carbon-fiber-containing composite materials, fluorinated polymers, enamels, glass, rubberized steels and any combination of two or more of the materials.

20. The method according to claim 19, wherein the cladding material is selected from the group consisting of graphite, silicon carbide, polytetrafluoroethylene and any combination of two or more of the materials.

21. The method according to claim 14, which comprises removing the extraction-agent-containing solution from the lower portion of the distillation device at a concentration of extraction agent in the solution of from 30 to 60 wt. %.

22. The method according to claim 14, which comprises concentrating the extraction-agent-containing solution in the evaporation device up to a concentration of the extraction agent in the solution of between 40 and 80 wt. %.

23. The method according to claim 14, wherein extraction agent contains or consists of at least one substance selected from the group consisting of sulfuric acid, alkali metal halides, alkaline earth metal halides, aluminum halides, ammonium halides and any combination of two or more of the substances.

24. The method according to claim 14, wherein the concentrated extraction-agent-containing solution is returned to the upper and/or central portion of the distillation device after exiting the evaporation device.

25. The method according to claim 14, which comprises heating the distillation device with an exhaust vapor formed by evaporation in the evaporation device during concentration of the extraction-agent-containing solution.

26. The method according to claim 25, which comprises removing the exhaust vapor formed in the evaporation device from the evaporation device and feeding the exhaust vapor into a heat exchanger and condensing same therein, and also feeding the extraction-agent-containing solution which is removed from the lower portion of the distillation device to the heat exchanger, the extraction-agent-containing solution which is fed to the heat exchanger being evaporated by the released condensation heat and the vapor being returned to the lower portion of the distillation device.

27. The method according to claim 26, which comprises bringing a partial stream or a complete stream of the exhaust vapor that is condensed in the heat exchanger into contact with the exhaust vapor removed from the evaporation device before being introduced into the heat exchanger in order to form saturated vapor from the exhaust vapor that is removed from the evaporation device before being introduced into the heat exchanger.

28. The method according to claim 14, which comprises carrying out the extractive distillation at an absolute pressure of 0.01 to 0.30 MPa.

29. The method according to claim 14, wherein a temperature in the lower portion of the distillation device is 50 to 200° C.

30. The method according to claim 14, wherein a temperature in the upper portion of the distillation device is 30 to 190° C.

31. The method according to claim 14, which comprises providing a hydrogen halide starting solution having a hydrogen halide content of from 1 to less than 35 wt. %.

32. The method according to claim 14, wherein the hydrogen halide vapor removed from the upper portion of the distillation device and/or the hydrogen halide gas removed from the upper portion of the distillation device has a hydrogen halide content of at least 30 wt. %.

33. The method according to claim 14, which comprises dehydrating by condensation the hydrogen halide vapor removed from the upper portion of the distillation device and/or the hydrogen halide gas removed from the upper portion of the distillation device.

* * * * *